(12) United States Patent
Mooz

(10) Patent No.: US 8,434,606 B2
(45) Date of Patent: May 7, 2013

(54) CLUTCH

(75) Inventor: Daniel Mooz, Hattingen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 13/223,859

(22) Filed: Sep. 1, 2011

(65) Prior Publication Data

US 2011/0308910 A1    Dec. 22, 2011

Related U.S. Application Data

(63) Continuation of application No. PCT/DE2010/000393, filed on Apr. 1, 2010.

(30) Foreign Application Priority Data

Apr. 27, 2009 (DE) .................... 10 2009 019 074

(51) Int. Cl.
*F16D 13/58* (2006.01)

(52) U.S. Cl.
USPC .................................. 192/70.16; 192/109 R

(58) Field of Classification Search .............. 192/48.1, 192/48.8, 70.16, 70.18, 70.3
See application file for complete search history.

(56) References Cited

U.S. PATENT DOCUMENTS

| 2,234,459 | A | * | 3/1941 | Wemp .................. 192/70.18 |
| 2,442,787 | A | * | 6/1948 | Vincent ................ 192/48.91 |
| 5,647,468 | A | * | 7/1997 | Villata et al. ........... 192/109 R |
| 2002/0144875 | A1 | | 10/2002 | Dau et al. |

FOREIGN PATENT DOCUMENTS

| DE | 19918735 A1 | 9/2000 |
| EP | 1 413 792 A1 | 4/2004 |
| EP | 1 475 550 A1 | 11/2004 |
| FR | 2803346 A1 | 7/2001 |
| FR | 2 824 370 A1 | 11/2002 |
| FR | 2 851 627 A1 | 8/2004 |
| JP | 57112135 A | 7/1982 |
| WO | 04076883 A1 | 2/2004 |

OTHER PUBLICATIONS

Machine translation of the Description of FR 2824370 A1, translation dated Jun. 13, 2012.*

* cited by examiner

*Primary Examiner* — Rodney Bonck
(74) *Attorney, Agent, or Firm* — Volpe and Koenig, P.C.

(57) ABSTRACT

A clutch having a pressure plate (1) and a counter plate (16) is provided, with the pressure plate being displaceable by a clutch actuating mechanism such that a clutch disk can be clamped between the pressure plate and counter plate. The pressure plate is a multi-piece pressure plate having a central body (1) which includes a friction surface and on which at least one connecting element (5) is located, which protrudes beyond the friction surface and is connected to the clutch actuating mechanism for burst optimization and cost savings purposes.

20 Claims, 4 Drawing Sheets

CLUTCH

CROSS-REFERENCE TO RELATED APPLICATIONS

This application is a continuation of PCT/DE2010/000393, filed Apr. 1, 2010, which claims the benefit of German Patent Application No. 10 2009 019 074.0, filed Apr. 27, 2009, both of which are incorporated herein by reference as if fully set forth.

BACKGROUND

The present invention relates to a clutch with a pressure plate and counter plate, wherein the pressure plate can be displaced by a clutch actuation mechanism, so that a clutch disk can be clamped between the pressure plate and counter plate. The present invention relates, in addition, to a double clutch with a drive-side sub-clutch and a transmission-side sub-clutch.

According to prior art, the pressure plate of a clutch is cast from one piece and has a central ring body and links that extend outward in the radial direction and by which the pressure plate is connected to the actuation system. Thus, for example, the pressure plate of the drive-side sub-clutch of a double clutch has links that are connected (e.g., riveted) to a tie rod that can be displaced in the axial direction by a plate spring/lever spring.

Therefore, because the links reach out in the radial direction for the riveting of the tie rod by the friction face, during operation, flexural or tensile stresses occur in the base area of the links that lead to the result that the pressure plate could burst. The occurring flexural or tensile stresses are here dependent on rotational speed, wherein, due to manufacturing tolerances and influences in operation, the bursting rotational speed of the pressure plate could vary significantly.

In addition, the geometry of the pressure plate is difficult to manufacture with the links in terms of casting. Pores and cavities that lead to high defect rates appear especially in the transition region of the links into the ring body of the pressure plate due to the differences in the diameters between the links and central ring body.

SUMMARY

Therefore, one objective of the present invention is to provide a pressure plate with higher bursting strength.

This objective is met according to the invention by a clutch with a pressure plate and counter plate, wherein the pressure plate can be displaced by a clutch actuation mechanism, so that a clutch disk can be clamped between the pressure plate and counter plate, wherein the pressure plate has a multiple-part construction and has a central body that comprises a friction face and on which at least one connection element is arranged (in particular: affixed) that projects over the friction face and connects to the clutch actuation mechanism.

The central body is advantageously rotationally symmetric, in particular, constructed as a ring body and could be produced using casting technology.

Furthermore, several connection elements are advantageously provided.

According to one especially preferred embodiment, the connection element/elements is/are constructed as angle/angles that is/are affixed, in particular, riveted or screwed, on the central body or that is/are assembled with the central body with a positive-fit and/or material-fit connection. Here, the angle/angles can contact a side of the pressure plate facing away from the clutch disk. Furthermore, the angle/angles can be made from sheet metal. In addition, the angle/angles can have one or more reinforcing sections.

According to one especially preferred embodiment, several connection elements are provided that are constructed as angles and are arranged distributed along the periphery (for example, in an installation situation of a double clutch, in a 50°/70° distribution) on a central body with a rotationally symmetric construction.

With this multiple-part construction of the pressure plate including the central body and at least one connection element assembled with this central body for the clutch actuation mechanism, the central body can be produced as an economical cast-iron body, wherein the at least one/several connection element/elements possibly made from different materials can then be affixed on this central cast-iron body. Due to this configuration, the bursting rotational speed of the pressure plate built according to the invention is significantly increased and an economical, simple, and low-defect casting compound is produced.

Double clutches are often constructed with a wear stop for the individual sub-clutches. The function of the wear stop is to no longer allow the pressure force at the end of the clutch service life to flow via the clutch disk, but instead to form a mechanical stop, wherein slippage of the clutch disk is achieved.

With the present multiple-part pressure plate consisting of the central body and at least one connection element, a wear stop can be realized economically just for the drive-side sub-clutch. Here, at an axially oriented area of the connection element, at least one projection is arranged as a wear stop that contacts the counter plate of the clutch in the maximum wear state.

The clutch can further have a tie rod that has an attachment area that is connected to the connection element and is connected to the clutch actuation mechanism, in particular, with a plate spring of the clutch actuation mechanism.

The present invention further provides a double clutch with a drive-side sub-clutch and a transmission-side sub-clutch, wherein the drive-side sub-clutch comprises a multiple-part pressure plate with the features according to at least one of the preceding embodiments.

BRIEF DESCRIPTION OF THE DRAWINGS

The present invention will be explained in detail below with reference to preferred embodiments in connection with the associated figures.

Shown in these figures are.

DETAILED DESCRIPTION OF THE PREFERRED EMBODIMENT

Figure 1:
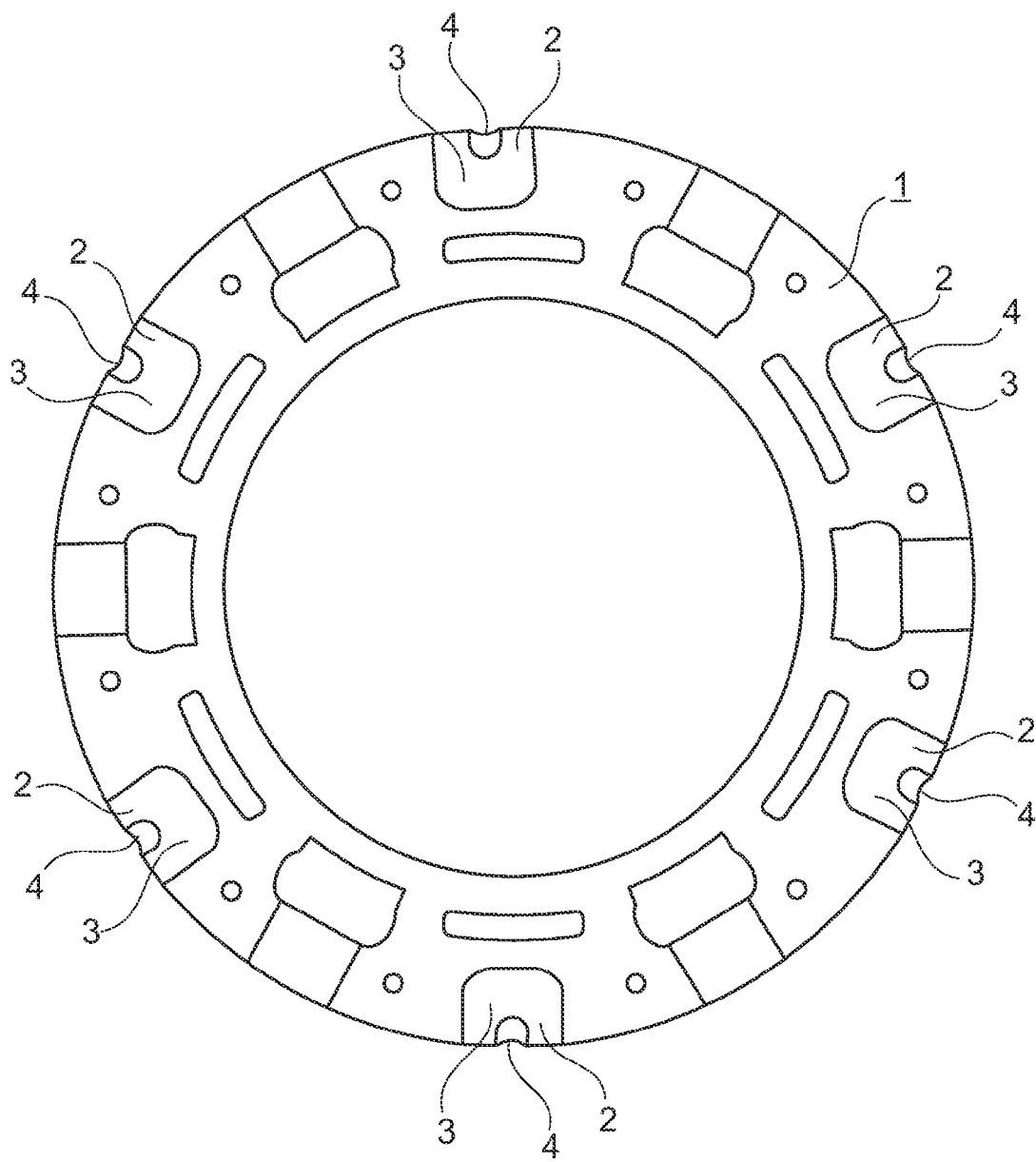
FIG. 1 is a top view of a pressure plate of a drive-side sub-clutch of a double clutch from the viewing direction of the drive.

FIG. 1 shows the ring body 1 of the multiple-part pressure plate.

As can be inferred from FIG. 1, this ring body 1 has no links, wherein the casting geometry is very simple and the possibility of a defect is greatly reduced accordingly. In addition, additional freedoms are gained for attaching the casting spout or the possibility for subsequently grinding or turning the outer diameter of the ring body 1, wherein a very small unbalanced mass can be achieved.

Figure 2:
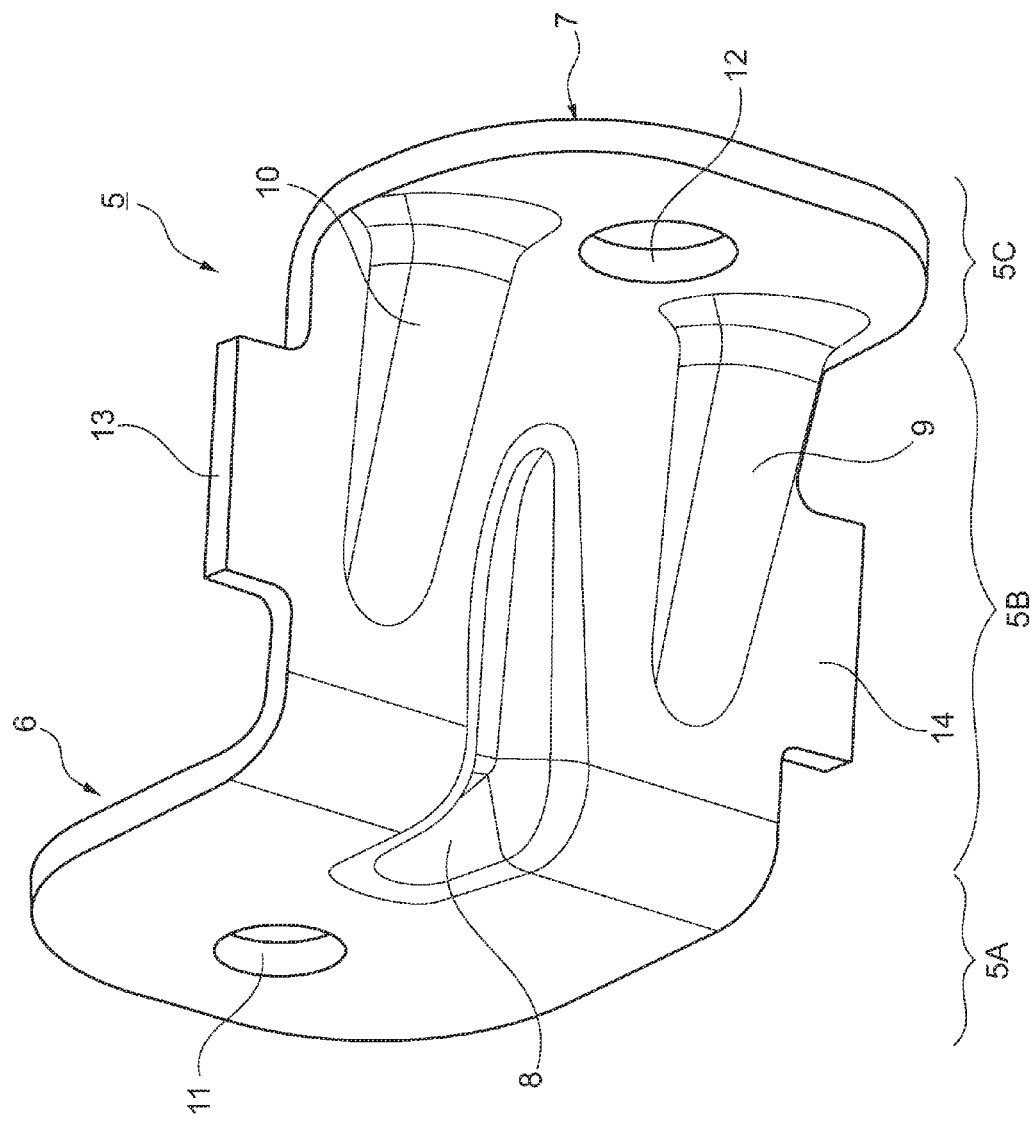
FIG. 2 is a view of an angle that is used as a connection element between the pressure plate of the sub-clutch and the tie rod of the sub-clutch.

After production of the ring body as a cast-iron body, this is subsequently turned or ground in the area of the later friction face (not visible in FIG. 1). In addition, the contact faces 2 for the angles 5 used as connection elements and shown in FIG. 2 are milled in the ring body 1 or formed in this body in a different way. These contact faces 2 are arranged on the side of the cast-iron body 1 opposite the friction face (i.e., "the back side").

In the area of these contact faces 2, according to the present embodiment, at least one rivet hole 3 is formed, so that the angles 5 could be connected to the ring body 1 to form a multiple-part pressure plate.

As can be inferred from FIG. 1, a recess 4 is also formed on the contact face 2, wherein this recess is used as a holder for a reinforcing area 8 that is formed in the angles 5 and will be described in more detail below.

The number and construction of the rivet holes 3 and also the number and shape of the recesses 4, as well as the number and shape of the reinforcing areas 8 can be adapted freely to the respective use case. The type and means of connection between the angles 5 and ring body 1 itself can also be adapted freely to the respective conditions.

In addition, the ring body 1 can be indeed produced preferably as a cast-iron body, but the use of other materials than cast iron is alternatively also possible.

The angles 5 shown in FIG. 2 are assembled to the contact faces 2 of the ring body 1. For this purpose, the angles 5 comprise a first area 5A that is arranged in the radial direction and includes a contact face 6 that contacts the contact face 2. This first area 5a oriented in the radial direction also comprises a rivet hole 11 through which the connection rivet extends.

The angle 5 further comprises an area 5B that is oriented in the axial direction and on which wear stops 13 and 14 are arranged that will be described in more detail below and are also called "wings."

For reinforcing the transition area of the first radial area 5A and axial area 5B, the reinforcing area 8 is provided that engages in the recess 4 of the ring body 1 in the mounted state.

The angle 5 also comprises a second area 5C that is oriented in the radial direction and comprises the contact face 7, wherein the contact faces 7 are provided for contact on corresponding contact faces of a tie rod of the drive-side sub-clutch.

Furthermore, in each contact face 7 of the second area 5C oriented in the radial direction, there is at least one rivet hole 12 to connect the angle 5 to the tie rod.

The transition area of the axial area 5B and second radial area 5C is reinforced by the reinforcing areas 9 and 10.

These angles 5 affixed to the ring body 1 of the built pressure plate are produced from sheet metal according to the present embodiment and are riveted on the ring body. These angles produced from sheet metal have significantly tougher material properties than the cast-iron material (in particular, gray cast iron) of the ring body 1. Due to the better toughness, bursting of the angles can be prevented. In addition, the angles are very stiff in the axial direction due to the geometry shown in FIG. 2.

Figure 3:
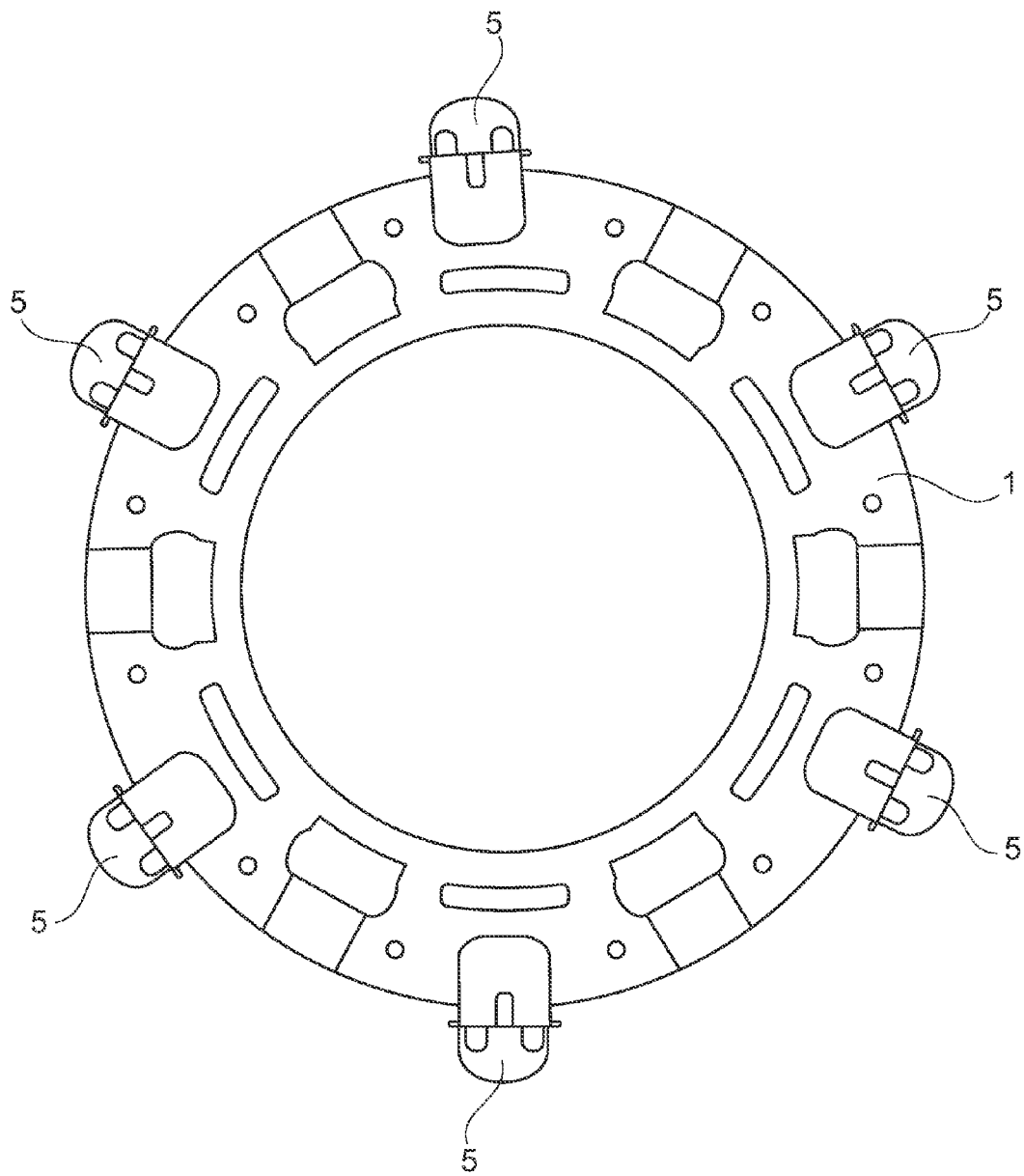
FIG. 3 is a top view of a pressure plate of the drive-side sub-clutch from the viewing direction of the drive with ring body according to FIG. 1 and several angles according to FIG. 2 arranged distributed along the periphery of the ring body as a function of the respective installation situation.

In FIG. 3, the built pressure plate is shown as an assembly consisting of ring body 1 and a total of six angles 5 as one possible embodiment. A distribution of the angles 5 along the periphery of the ring body 1 and a number of angles 5 can be adapted freely to the respective use case.

Figure 4:
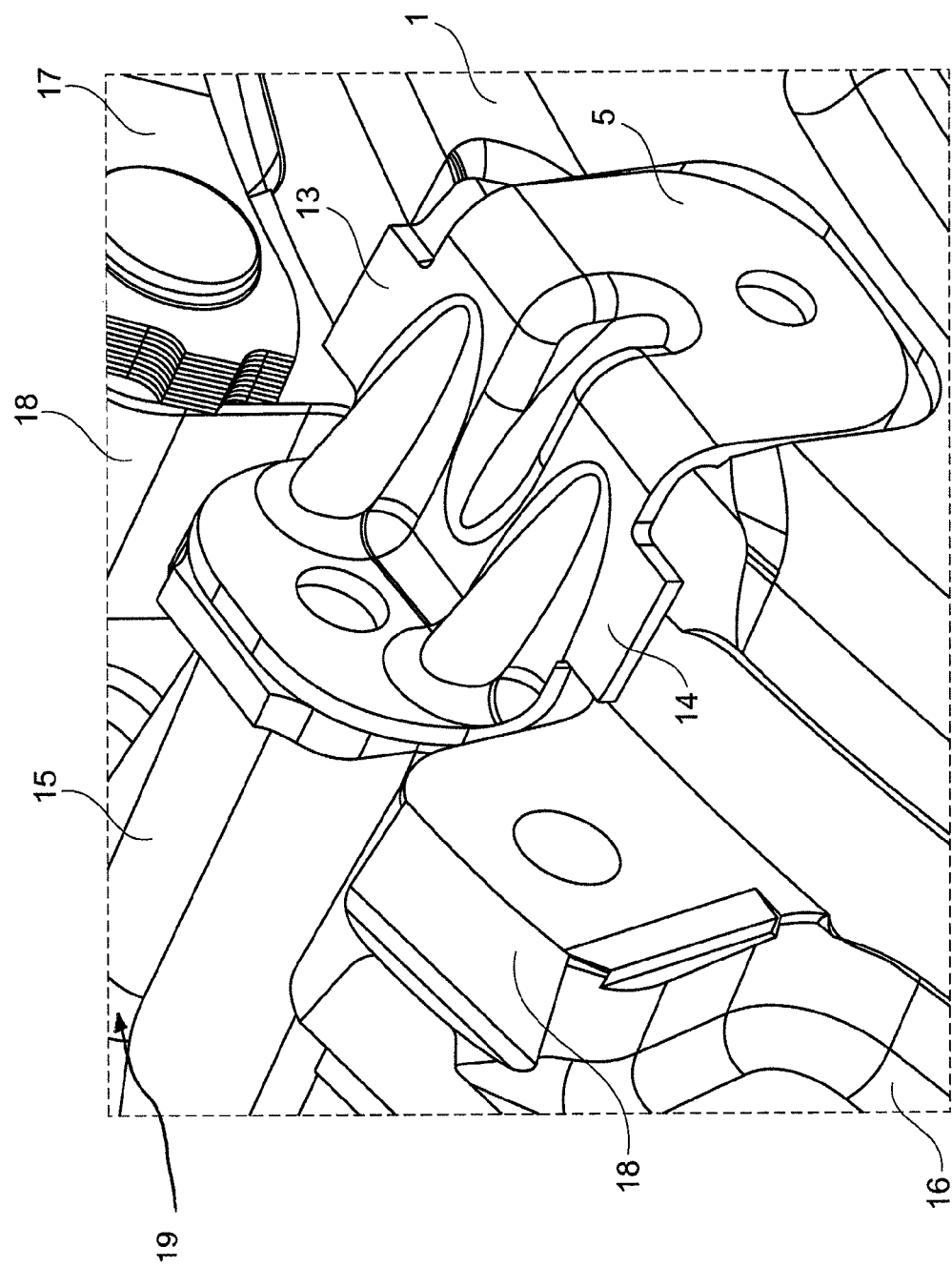
FIG. 4 is a perspective view of the double clutch in the area of the connection between the tie rod and pressure plate of sub-clutch.

In FIG. 4, a perspective diagram of a partial area of the double clutch is shown in the area of the connection between the multiple-part pressure plate (i.e., the built pressure plate) with ring body 1 and angles 5 on one side, as well as tie rod 15 and central counter plate 16, as well as the leaf springs 17 between the central counter plate and multiple-part pressure plate. A clutch actuation mechanism 19 is connected to tie rod 15.

As mentioned in connection with FIG. 2, the angles 5 also comprise a mechanical wear stop for the drive-side sub-clutch via the wings 13 and 14 that can be inferred, in particular, from FIG. 2 in the axial area 5B of the angles 5. These wings 13, 14 run in the maximum wear state against the friction face of the central counter plate 16, as can be inferred from FIG. 4. Just from this figure it is clear that these wings 13, 14 can run against the links 18 of the central counter plate.

Due to the presently very short tolerance chain between the friction face of the central counter plate 16, the clutch disk, the built pressure plate of the sub-clutch, and the wings 13, 14, a very precise wear stop can be realized. Because the links 18 of the central counter plate 16 take over the function of the wear stop in this case, a cost-intensive and tolerance-loaded milling process can be eliminated.

Advantages of the present pressure plate with multiple-part construction are also the ring body of the pressure plate that can be produced using casting technology in a very simple and economical way, as well as the tough and axially stiff attachment of the ring body to the tie rod by the angles and also the wear stop that can be produced very economically and acts with precision.

Accordingly, this arrangement produces an optimization of the bursting rotational speed of the clutch, an economical and precise wear stop for the sub-clutch, and a simple geometry of the pressure plate for minimizing rejects.

List Of Reference Symbols
1 Ring body
2 Contact face
3 Drilled rivet hole
4 Recess
5 Angle
5A Radial arranged area
5B Axial area
5C Axial area
6 Contact face
7 Contact face
8 Reinforcement
9 Reinforcement
10 Reinforcement
11 Drilled rivet hole
12 Drilled rivet hole
13 Wear stop
14 Wear stop

The invention claimed is:

1. A clutch comprising a pressure plate and counter plate, the pressure plate is displaceable by a clutch actuation mechanism for clamping a clutch disk between the pressure plate and counter plate, the clutch actuation mechanism is located on a side of the pressure plate that includes a friction face, the pressure plate is a multiple-part pressure plate that has a central body that comprises the friction face and a back face, and is assembled with at least one connection element that projects radially past a circumferential edge of the pressure plate and the friction face and that attaches to the back face of the pressure plate, and is in connection with the clutch actuation mechanism, the at least one connection element includes two areas arranged in a radial direction and one area arranged in an axial direction, wherein an inner one of the radial areas has a first contact face that abuts and is secured to the back face of the pressure plate and an outer one of the radial areas has a second contact face that abuts and is secured to the clutch actuation mechanism, wherein a projection as a wear stop is arranged on the axially oriented area of the at least one connection element, and the wear stop contacts the counter plate in a maximum wear state.

2. The clutch according to claim 1, wherein the central body has a rotationally symmetric construction.

3. The clutch according to claim 2, wherein the central body is a cast body.

4. The clutch according to claim 1, wherein a plurality of the connection elements are provided.

5. The clutch according to claim 1, wherein each of the at least one connection elements comprises an angle having a z-shape that is affixed, riveted or screwed, on the central body or are assembled with the central body using a positive-fit and/or material-fit connection.

6. The clutch according to claim 5, wherein each of the angles contacts a side of the pressure plate facing away from the clutch disk.

7. The clutch according to claim 5, wherein each of the angles are made from sheet metal.

8. The clutch according to claim 5, wherein each of the angles have one or more reinforcing sections.

9. The clutch according to claim 1, wherein a plurality of the connection elements are arranged distributed along a periphery of the central body, which is rotationally symmetric.

10. The clutch according to claim 1, wherein the central body is a ring body.

11. A clutch comprising a pressure plate and counter plate, the pressure plate is displaceable by a clutch actuation mechanism for clamping a clutch disk between the pressure plate and counter plate, the clutch actuation mechanism is located on a side of the pressure plate that includes a friction face, the pressure plate is a multiple-part pressure plate that has a central body that comprises the friction face and a back face, and is assembled with at least one connection element that projects radially past a circumferential edge of the pressure plate and the friction face and that attaches to the back face of the pressure plate, and is in connection with the clutch actuation mechanism, the at least one connection element includes two areas arranged in a radial direction and one area arranged in an axial direction, wherein an inner one of the radial areas has a first contact face that abuts and is secured to the back face of the pressure plate and an outer one of the radial areas has a second contact face that abuts and is secured to the clutch actuation mechanism, further comprising a tie rod that has an attachment area connected to the at least one connection element and in active connection with a plate spring of the clutch actuation mechanism.

12. The clutch according to claim 11, wherein the central body has a rotationally symmetric construction.

13. The clutch according to claim 11, wherein the central body is a cast body.

14. The clutch according to claim 11, wherein a plurality of the connection elements are provided.

15. The clutch according to claim 11, wherein each of the at least one connection elements comprises an angle having a z-shape that is affixed, riveted or screwed, on the central body or are assembled with the central body using a positive-fit and/or material-fit connection.

16. The clutch according to claim 15, wherein each of the angles contacts a side of the pressure plate facing away from the clutch disk.

17. The clutch according to claim 15, wherein each of the angles are made from sheet metal.

18. The clutch according to claim 15, wherein each of the angles have one or more reinforcing sections.

19. The clutch according to claim 11, wherein a plurality of the connection elements are arranged distributed along a periphery of the central body, which is rotationally symmetric.

20. The clutch according to claim 11, wherein the central body is a ring body.

* * * * *